UNITED STATES PATENT OFFICE.

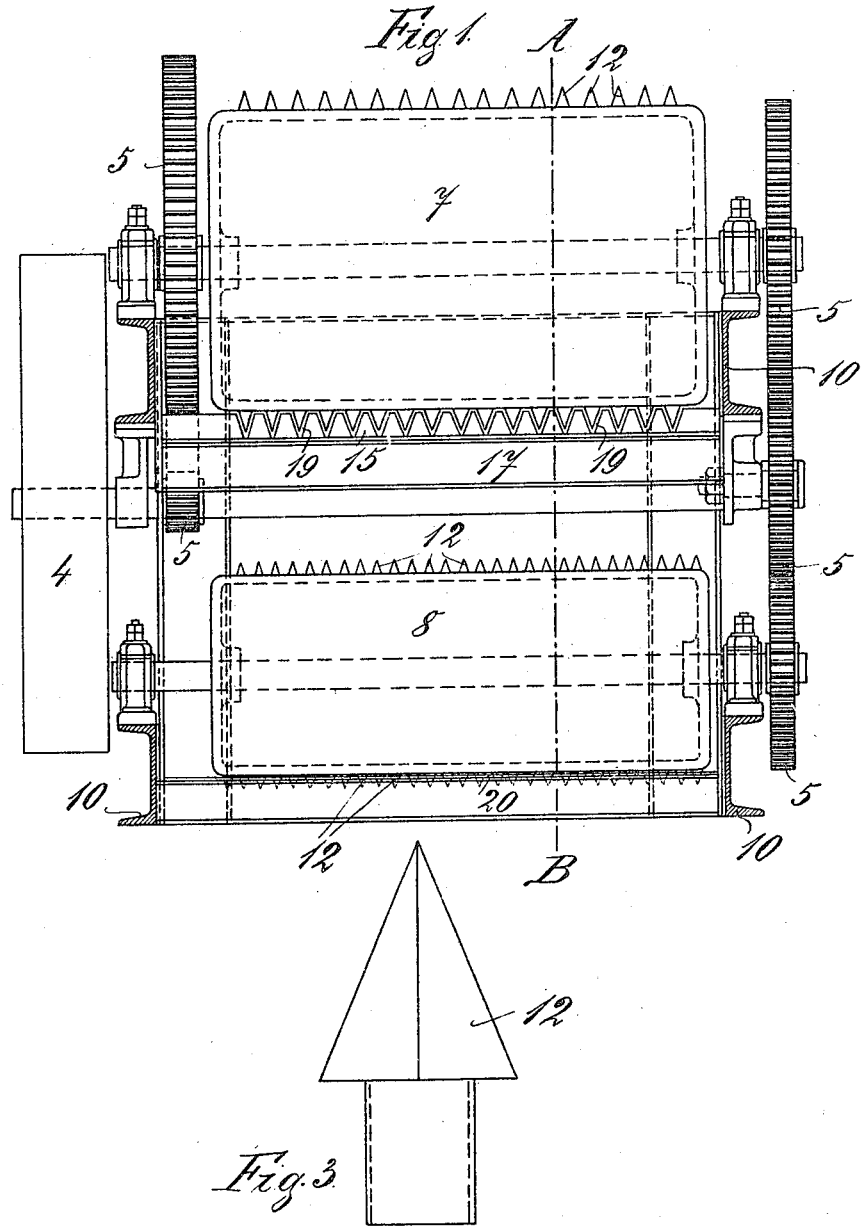

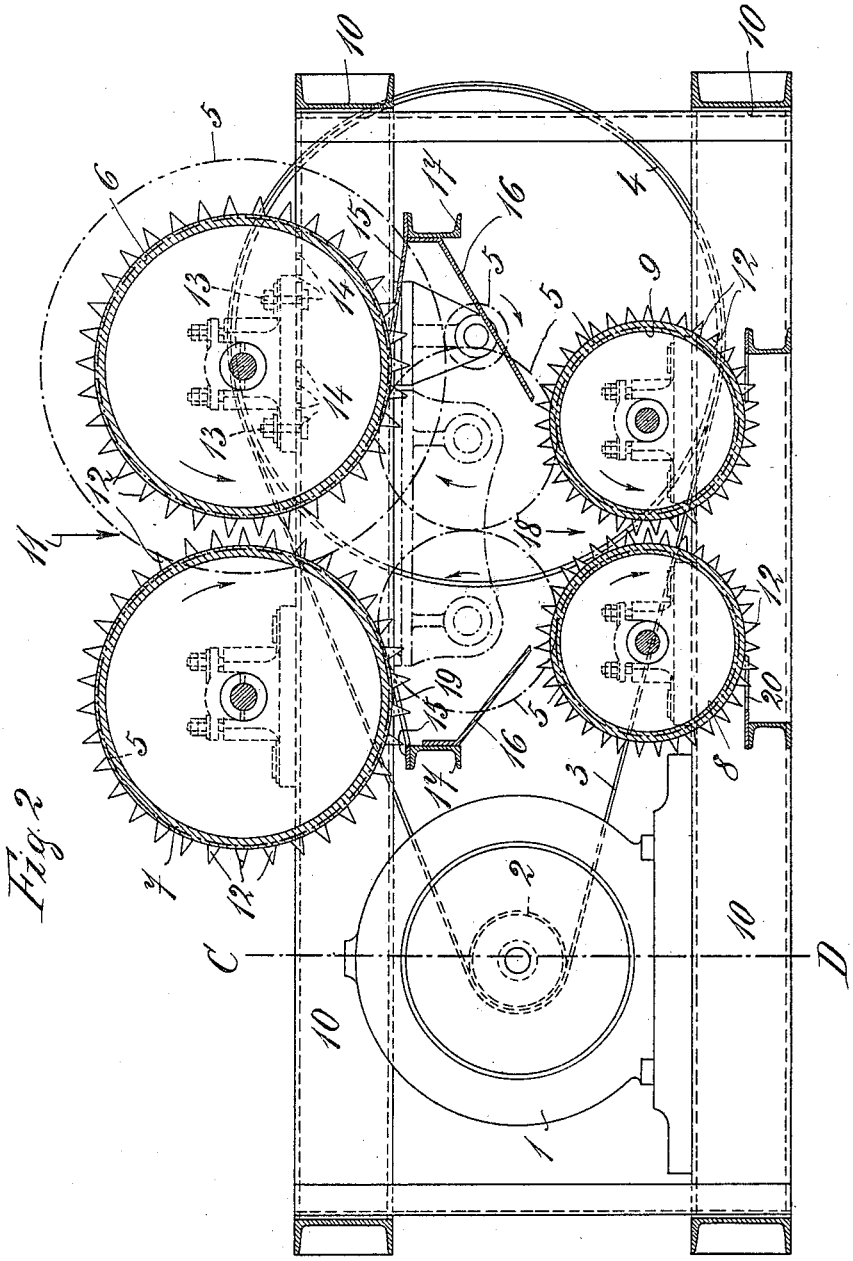

HANS GOLDSCHMIDT, OF ESSEN-ON-THE-RUHR, GERMANY, ASSIGNOR, BY MESNE ASSIGNMENTS, TO GOLDSCHMIDT DETINNING COMPANY, OF JERSEY CITY, NEW JERSEY, A CORPORATION OF NEW YORK.

APPARATUS FOR PREPARING TINNED SHEET-IRON BOXES, &c., FOR DETINNING.

1,075,781.   Specification of Letters Patent.   Patented Oct. 14, 1913.

Application filed January 22, 1907. Serial No. 353,536.

*To all whom it may concern:*

Be it known that I, HANS GOLDSCHMIDT, doctor of chemical science, a subject of the King of Prussia, German Emperor, and resident of Essen-on-the-Ruhr, in the German Empire, have invented new and useful Improvements in Apparatus for Preparing Tinned Sheet-Iron Boxes, &c., for Detinning, of which the following is a specification.

My present invention is in the nature of an improvement upon that shown, described and claimed in Letters Patent No. 804,530, granted to me November 14, 1905, which patent relates to a similar method of preparing sheet-iron boxes, etc., for detinning. In practice it has been found that when a method and apparatus such as set forth in said prior patent are used, only a certain size of boxes or other material can be properly treated and fed in a regular manner between the rollers by which the boxes are to be compressed, the size of the boxes, etc., being proportionate to the width of the pass between the rollers. When boxes of too large a size are fed to the rollers they are not properly presented and are not fed at once into the pass between the rollers, but roll about in front of the pass, sometimes for a considerable length of time, before they are caught and positively fed into the pass by the projecting perforators with which the rollers are equipped. Constant attention on the part of the workman in charge of the machine is required when boxes of excessive size are fed into a machine of the type illustrated in my prior patent.

The principal object of my present invention is to improve the apparatus disclosed in said prior patent for preparing boxes for detinning, and in doing so I have found it necessary to divide the compressing function into two distinct parts, and I preferably divide each of the two main functions, that is, both the compressing and perforating, into two distinct parts. To divide the compressing function into two main parts I provide an additional pair of compressing rollers, which operate upon the tinned boxes, etc., and compress the same partially before such partially compressed boxes are fed to the second pair of rollers, where they are fully compressed. The first pair of compressing rollers, as well as the
second, may have perforators projecting from the surfaces thereof when it is desired to divide the perforating functions also into two distinct parts, as is preferably the case.

The first pair of rollers are advantageously of larger diameter than the second pair of rollers, and the second pair of rollers will usually be disposed below the first pair and will receive the partially compressed tin-boxes, etc., directly therefrom. The two pairs of rollers may be rotated by any suitable means, as for example, by a train of gearing driven from a suitable source of power. The same apparatus should be capable of treating both large and small sizes of boxes, and in order to permit this the width of the pass between the first pair of rollers should be capable of adjustment to accommodate boxes of different sizes. This adjustment may be obtained by mounting one of the rollers of the first pair in such a manner that it may be adjusted toward and from the other and securely held in place in any desired adjusted position, this adjustment being usually in a horizontal plane. In this way the pass between the first or upper pair of rollers into which boxes are fed in any suitable manner, is increased or decreased in width to correspond to the size of the boxes to be compressed, and thus the shifting and rolling about of the boxes at the entrance of the pass is prevented, and each box is properly caught between the rollers and compressed as soon as it is presented at the pass. After the first partial compression, and also partial perforation, when the rollers of the first pair are provided with perforators, the flattened partially compressed and perforated boxes are delivered to the lower pair of rollers by which said boxes are fully compressed and completely perforated. Suitable means are provided for scraping off the compressed and perforated boxes from the rollers of each pair and assuring the delivery of the partially compressed boxes directly to the pass between the rollers of the lower pair.

In the drawings, Figure 1 is a front elevation, partly in transverse section, the section being taken in the line C—D, Fig. 2, with the motor removed; Fig. 2 is a side elevation and longitudinal section of the same, the section being taken in line A—B, Fig. 1; Figs. 3 and 4 are details of a specific type of perforator preferably employed for puncturing the tinned boxes, etc., the perforator being shown full size.

Referring now to the drawings, 1 represents a source of power of any suitable kind, an electric motor being here illustrated, and 2 a driving pulley secured to the shaft of the motor, from which pulley movement is transmitted by a belt 3 to a driven pulley, such as 4, here shown as of large size. The rotary movement of this driven pulley may be transmitted by means of a train of gearing, such as 5, to the two pairs of rollers which operate upon the material. The rollers of the first or upper pair are designated respectively by 6 and 7, and those of the second and lower pair are designated respectively by 8 and 9. The comparative sizes of the rollers of the first and second pairs should be such that the material will be operated upon at the first stage of the operation by surfaces traveling at a slower speed than during the second stage of the operation. For this reason the rollers of the first or upper pair are of larger diameter than those of the lower pair, and the surfaces thereof move at a lower circumferential speed than the surfaces of the rollers of the lower pair.

The two pairs of rollers may be mounted in a frame structure of any suitable type, such for example as that illustrated at 10. The rollers themselves are intended not only to compress the material but also to perforate the same, and both pairs of rollers are preferably provided with suitable perforators for puncturing the boxes. I prefer to use a type of perforator such as shown in detail in Figs. 3 and 4, the body portion of such perforator being pyramidal, as shown at 12. These perforators project from the surfaces of the rollers and cover substantially the whole of the surface of each roller to which they are applied. The perforators will usually be arranged in regular rows both lengthwise and circumferentially of the rollers. Perforators of this construction readily puncture the boxes and other material presented to them and enlarge the small openings first formed by them with the expenditure of a minimum amount of power and without entirely separating any part of the material from the body of the box. The sharp points of these perforators also serve to catch the boxes the moment the boxes are presented to the rollers, and, to feed the same positively into the pass between adjacent rollers.

It will be noticed that the perforators of the first or upper pair of rollers are of relatively large size as compared with those carried by the lower pair of rollers and are also disposed somewhat farther apart than those of the lower rollers. The object of this is to effect a coarse preliminary puncturing of the material as well as a partial compressing by the rollers of the upper pair, after which the complete compression of the material will be effected by the rollers of the lower pair, and at the same time the perforators carried by the lower rollers will thoroughly puncture the boxes, etc., at a larger number of points than the perforators of the upper rollers. Thus when the treatment is complete the material will be in such a condition that the chemicals used in the subsequent detinning process will have free access to all parts of such material.

As before stated, an important feature of the invention relates to the adjustment of the width of the pass between the first pair of rollers. The adjustment of this pass is in this case effected by shifting the roller 6 to any one of a number of positions horizontally relatively to the coöperating roller 7. This roller 6 is so mounted that it can be shifted readily horizontally on the upper frame-piece of the frame 10. The upper frame-piece is here shown as having a series of holes 14 passing therethrough, through which bolts, such as 13, carried by the bearing or pillow-block for the shaft of the roller 6 may pass and be secured in place by the usual nuts. Sets of openings 14 are shown at each side of the shaft supported by such pillow-block, in order that the pillow-block may be bolted down securely at both sides thereof. A sufficient number of holes should be provided to permit the adjustment of the roller 6 to the necessary positions for handling all the different sizes of boxes intended to be compressed by the machine. It is obvious, of course, that other means may be employed for adjusting the position of the roller 6 with respect to the roller 7 and varying the width of the pass between said rollers.

Any suitable provision may be made in the power transmitting mechanism for permitting of the described adjustment of the roller 6 relatively to the roller 7. For instance, the depth of the teeth of the gear wheels shown is such as to maintain an operative mesh while permitting of a certain limited adjustment of the said rollers, while any additional adjustment of the latter might be provided by substituting gear wheels of different and desired diameters.

In practice the boxes to be compressed and perforated are delivered to the machine from above between the upper rollers 6 and 7, the direction of feed being indicated by the arrow 11 in Fig. 2. After the boxes are caught by the sharp points of the perforators carried by the upper rollers 6 and 7, these boxes will be fed positively into the pass between said rollers and partially compressed, at the same time being perforated throughout their area by the coarse perforators carried by said rollers. After being thus partially compressed and perforated, some of them will fall in the direction indicated by the arrow 18 between or onto the rollers of the lower pair and will be caught by the rotating-perforators carried by such rollers; while some of the boxes so partially compressed will cling to the perforators of the upper rollers and will be carried along with such rollers in their rotation until they are near or beyond the vertical planes passing through the axes of the upper rollers, when they must positively be removed from the perforators of the upper rollers in order to prevent them from being carried back to the upper side of the pass between said rollers. Such boxes as cling to said perforators may be removed therefrom by suitable scrapers, such as the plates 15 arranged substantially tangentially to the rollers and extending the whole length of the same. These scrapers are fastened to the upper portion of the framework in any suitable manner, and preferably have V-shaped tooth-spaces substantially complementary in size and shape to the V-shaped or pyramidal perforators 12 of the upper rollers, and lying respectively in the planes of rotation of such pyramidal perforators carried by the upper rollers. These scrapers 15 scrape off the compressed and partially perforated boxes clinging to the perforators as such perforators with the boxes clinging thereto come adjacent to the scrapers, and cause such boxes to drop upon suitable guide-walls, such as 16, attached to the scrapers 15 and to the upper part of the framework, as for example by means of channel-irons 17. These slanting walls serve as guides to direct the falling partially compressed and perforated boxes to the entrance of the pass between the lower rollers, at the arrow 18, between which rollers the boxes are fully compressed and perforated at a greater number of points in their surfaces by the finer perforators carried by the lower rollers. After being thus fully compressed and perforated the boxes, etc., leave the pass between the lower rollers and fall into a suitable receptacle (not shown) provided for the purpose. The lower rollers should also be provided with suitable means for removing the boxes which may cling to the perforators carried thereby. The means employed may be scrapers 20 similar to those shown at 15 and operating in the same manner, but having finer, that is, more closely spaced and smaller, tooth-spaces lying in the planes of rotation of the respective pyramidal perforators carried by the lower rollers.

What I claim is:—

1. A machine for preparing tinned boxes and the like for detinning, comprising a pair of spaced compressing rolls, each roll having fixed pointed projections on its periphery extending radially therefrom, and means for preliminarily partially compressing the boxes to place them in condition to be readily gripped by said rolls, said means comprising a second pair of rolls disposed above the first pair and spaced farther apart than said first-named rolls and also provided with pointed projections on their peripheries.

2. A machine for preparing tinned boxes and the like for detinning, comprising a pair of spaced compressing rolls, each roll having fixed pointed projections on its periphery extending radially therefrom, means for preliminarily partially compressing the boxes to place them in condition to be readily gripped by said rolls, said means comprising a second pair of rolls disposed above the first pair and spaced farther apart than said first-named rolls and also provided with pointed projections on their peripheries, and means to adjust the width of the space between said last-named rolls to accommodate boxes of different sizes.

3. A machine for preparing tinned boxes and the like for detinning, comprising a pair of spaced compressing rolls, each roll having fixed pointed projections on its periphery extending radially therefrom, and means for preliminarily partially compressing the boxes to place them in condition to be readily gripped by said rolls, said means comprising a second pair of rolls disposed above the first pair and spaced farther apart than said first-named rolls and also provided with pointed projections on their peripheries, but in less number and larger than those on the first-named pair, said last-named rolls being larger than the first and rotatable at a less rate of speed than said first-named rolls.

In witness whereof I have hereunto set my hand in the presence of two witnesses.

HANS GOLDSCHMIDT.

Witnesses:
 ALFRED POHLMEYER,
 M. ENGELS.